US009764856B2

(12) United States Patent
Stevens et al.

(10) Patent No.: US 9,764,856 B2
(45) Date of Patent: Sep. 19, 2017

(54) AIRCRAFT EXTERNAL DC POWER VOLTAGE PROTECTION

(71) Applicant: Hamilton Sundstrand Corporation, Charlotte, NC (US)

(72) Inventors: Clifford G. Stevens, Rockton, IL (US); Kenneth Kramer, Byron, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 500 days.

(21) Appl. No.: 14/294,763

(22) Filed: Jun. 3, 2014

(65) Prior Publication Data

US 2015/0344152 A1 Dec. 3, 2015

(51) Int. Cl.
| | |
|---|---|
| B64F 1/34 | (2006.01) |
| H02J 1/00 | (2006.01) |
| H02H 1/00 | (2006.01) |
| H02H 1/06 | (2006.01) |
| H02H 11/00 | (2006.01) |

(52) U.S. Cl.
CPC .............. B64F 1/34 (2013.01); H02H 1/0007 (2013.01); H02H 1/06 (2013.01); H02H 11/006 (2013.01); H02J 1/00 (2013.01)

(58) Field of Classification Search
None
See application file for complete search history.

(56) References Cited

U.S. PATENT DOCUMENTS

| | | | | |
|---|---|---|---|---|
| 4,144,551 A | * | 3/1979 | Smith | H02H 1/00 307/31 |
| 5,287,053 A | * | 2/1994 | Hutchinson | H02J 9/061 307/66 |
| 5,859,756 A | * | 1/1999 | Pressman | H02H 3/207 361/18 |
| 7,547,997 B1 | * | 6/2009 | Simunek | H01R 29/00 307/154 |

* cited by examiner

Primary Examiner — Rexford Barnie
Assistant Examiner — Swarna N Chowdhuri
(74) Attorney, Agent, or Firm — Locke Lord LLP; Daniel J. Fiorello; Joshua L. Jones

(57) ABSTRACT

An external power supply system for an aircraft includes a power receptacle configured to connect to an external power source to provide external power, a power switch operative to switch between a battery power source and the external power source, and a voltage check system configured to prevent at least one of under-voltage or over-voltage of an aircraft electrical system. The voltage check system includes a voltage relay sensor configured to determine if the external power is within a suitable voltage range and a check switch operatively connected to the voltage relay sensor, wherein if the external power is within a suitable voltage range, the voltage relay sensor activates the check switch to allow external power to the aircraft electrical system, and wherein if the external power is outside the suitable voltage range, then the voltage relay sensor does not allow power to the aircraft electrical system.

14 Claims, 3 Drawing Sheets

AIRCRAFT EXTERNAL DC POWER VOLTAGE PROTECTION

BACKGROUND

1. Field

The present disclosure relates to aircraft external power supply protection systems, more specifically to external power indicators and starter power supply circuits.

2. Description of Related Art

Aircraft can draw power from an external source when on the ground to power electronic systems and to avoid draining the battery when using high draw systems like the starter for an auxiliary power unit (APU). Such aircraft have an external power receptacle on the airframe for maintenance personal to plug an external DC power cart into the plane. Indicators such as "Available" and "In Use" can be disposed next to the receptacle and/or in the cockpit to indicate that external power is either available and/or in use, respectively. Also, a manual switch (usually push-button, push on, push off type) to change from aircraft battery power to external DC power can be included near the receptacle on the outside of the plane and/or in the cockpit.

Traditional indicators may operate even when insufficient power is supplied by the external DC power cart. For example, the "Available" indicator may activate at a lower voltage than required by the internal power switching circuitry causing a false indication of acceptable power supply. In such an instance, if the switch is thrown to change from battery to external DC power and the DC power voltage is too low to activate the electrical power distribution circuit (EPDC), the "Available" indicator will stay activated and nothing will happen (e.g., the "In Use" indicator would not activate), potentially causing confusion.

In a typical situation where the external DC power voltage is too high, the "Available" indicator will illuminate and potentially burn out. When the switch is pressed, the "In Use" indicator would briefly activate, and then both indicators would shut down due to over-voltage protection in the aircraft circuitry. After the manual switch is opened (pressed again) to activate the battery supply, the "Available" light would illuminate again (if it did not burn out) causing potential confusion and a likely over-voltage repeat by the user. Consequently, operators of such systems must learn to understand the indicator light behavior and use other information in situations such as those described above.

Such conventional methods and systems have generally been considered satisfactory for their intended purpose. However, there is still a need in the art for improved external power supply monitoring, indicating, and switching systems. The present disclosure provides a solution for this need.

SUMMARY

An external power supply system for an aircraft includes a power receptacle configured to connect to an external power source to provide external power, a power switch operative to switch between a battery power source and the external power source, and a voltage check system configured to prevent at least one of under-voltage or over-voltage of an aircraft electrical system. The voltage check system includes a voltage relay sensor configured to determine if the external power is within a suitable voltage range and a check switch operatively connected to the voltage relay sensor, wherein if the external power is within a suitable voltage range, the voltage relay sensor activates the check switch to allow external power to the aircraft electrical system, and wherein if the external power is outside the suitable voltage range, then the voltage relay sensor does not allow power to the aircraft electrical system.

The system can further include at least one first indicator operatively connected to the power receptacle to indicate that the external power is available. The voltage check system can be configured to only allow activation of the first indicator when the external power is within the suitable voltage range. The system can further include at least one second indicator operatively connected to the power receptacle to indicate that the external power is in use.

The voltage relay sensor can be configured to determine if the external power is within a low voltage threshold and a high voltage threshold. The low voltage threshold can be about 18 volts DC or any other suitable voltage. In some embodiments, the low voltage threshold is high enough to allow for starting of an auxiliary power unit. The high voltage threshold can about 32 volts DC or any other suitable voltage.

The voltage relay sensor can be operatively connected to the power receptacle to be powered by the external power, wherein in the event of a power sag in the external power supply, the battery power source powers the voltage relay sensor to prevent system shutoff.

The system can include an electrical power distribution circuit (EPDC) operatively connected to the power receptacle, and connected to and controlled by the voltage check system. The aircraft electrical system can include an APU starter operatively connected to the power receptacle when the EPDC is closed.

In at least one aspect, an aircraft electrical system includes a power receptacle configured to connect to an external power source to provide external power, a power switch operative to switch between a battery power source and the external power source, and a voltage check system configured to prevent at least one of under-voltage or over-voltage of an aircraft electrical system. The voltage check system of the aircraft electrical system includes a voltage relay sensor configured to determine if the external power is within a suitable voltage range, and a check switch operatively connected to the voltage relay system, wherein if the external power is within a suitable voltage range, the voltage relay sensor activates the check switch to allow external power to an electrical power distribution circuit (EPDC) of an aircraft, and wherein if the external power is outside the suitable voltage range, then the voltage relay sensor does not activate the check switch.

The check switch can include an inductive coil switch operatively coupled to the voltage relay sensor. The system can further include a voltage comparator between the voltage relay sensor and the external power source and the battery supply to allow for an auxiliary power unit (APU) starter to be supplied with power if a sufficiently high voltage is present in the battery supply to account for a voltage droop in the external power due to activating the APU starter, thereby preventing the check switch from opening and thus interrupting power during APU start.

The system can further include a first indicator operatively connected to the voltage relay sensor and the EPDC, wherein the first indicator is powered through the EPDC when the EPDC receives power through the voltage check system. The first indicator can indicate that the external power is available and acceptable.

The system can also include a second indicator operatively connected to the EPDC, wherein the second indicator is powered through the EPDC when the EPDC receives power through the voltage check system and when the power switch is changed from the battery power supply to the external power supply.

In at least one aspect of this disclosure, a method includes determining if an external power for an airplane has a voltage within a suitable voltage range, powering an electronic power distribution circuit (EPDC) if the external power for an airplane has a voltage within the suitable voltage range, and preventing power from being applied to the EPDC if the external power has a voltage outside of the suitable voltage range. The method can further include indicating that external power is available if the external power is determined to have a voltage within the suitable voltage range.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
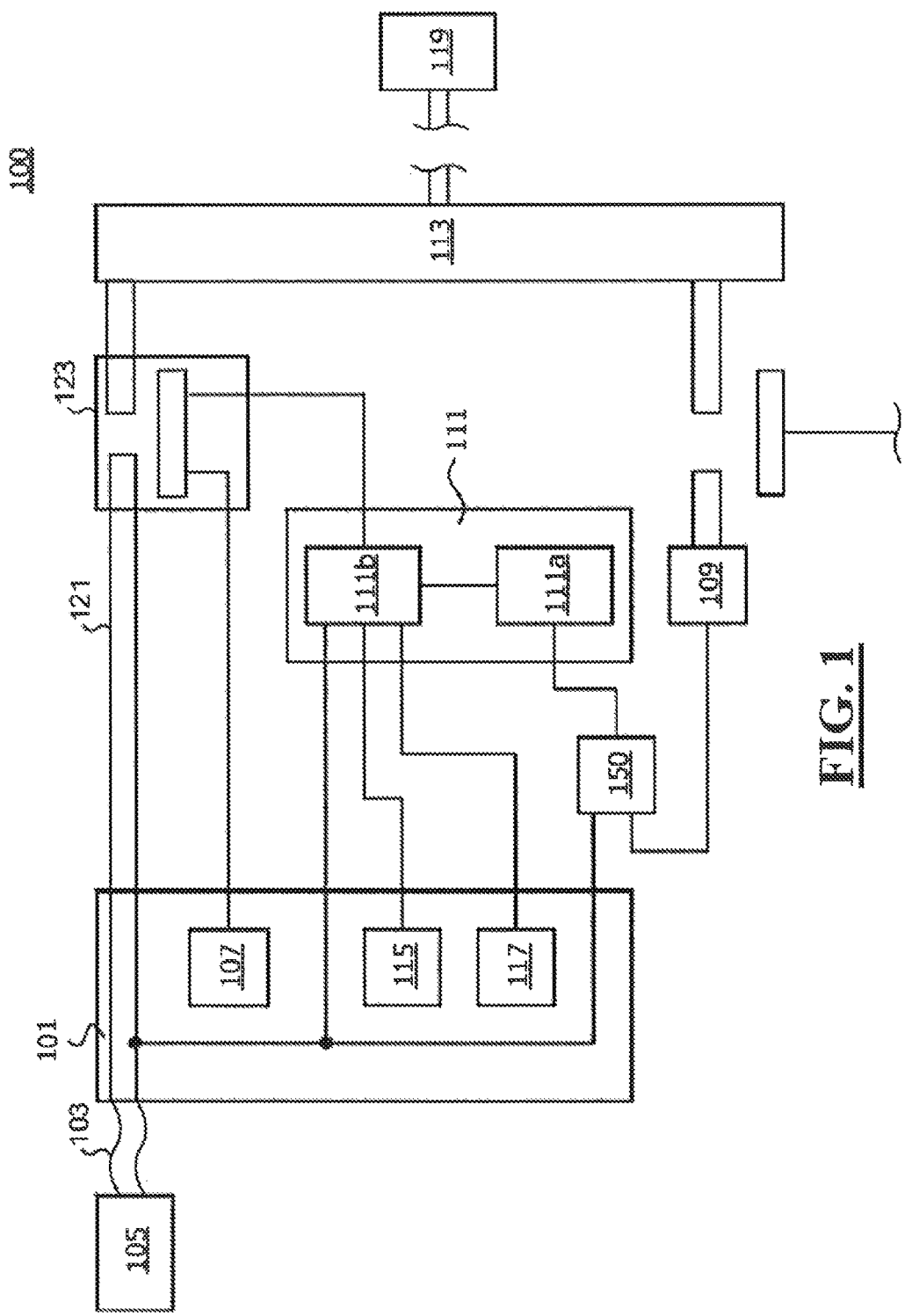
FIG. 1 is a schematic view of an embodiment of a system in accordance with this disclosure, showing a voltage check system disposed therein.

Reference will now be made to the drawings wherein like reference numerals identify similar structural features or aspects of the subject disclosure. For purposes of explanation and illustration, and not limitation, a systematic view an embodiment of the system in accordance with the disclosure is shown in FIG. 1 and is designated generally by reference character 100. The systems and methods described herein can be used to prevent under-voltage and/or over-voltage of electrical systems.

An external power supply system 100 for an aircraft includes a power receptacle 101 configured to connect to an external power cable 103 from an external power source 105 to provide an external power. The system 100 also includes a manual switch 107 operative to control the switching between a battery power source 109 and the external power source 105.

The system 100 further includes a voltage check system 111 configured to prevent at least one of under-voltage or over-voltage of at least one aircraft electrical system 113. The voltage check system includes a voltage relay sensor 111a configured to determine if the external power is within a suitable voltage range. The voltage relay sensor 111a can be any suitable sensor configured to activate a switch when a proper voltage is supplied to the sensor. The voltage relay sensor 111a can include any suitable circuitry, logic, software, or the like configured to check an electrical source voltage.

Voltage check system 111 also includes a check switch 111b configured to allow power to pass to the rest of system 100. The check switch 111b can be an inductive coil switch or any other suitable switch operatively coupled to the voltage relay sensor 111a.

An example of a suitable voltage check system 111 (combining a voltage relay sensor 111a and check switch 111b) includes Leach International Part No. VS-656, sold by Leach International Corporation of 6900 Orangethorpe Ave, Buena Park, Calif. 90620.

If the external power is within a suitable voltage range, the voltage relay sensor 111a activates the check switch 111b to allow external power to the aircraft electrical system 113 such that if the external power is outside the suitable voltage range, then the voltage relay sensor 111a does not allow power to an electrical power distribution circuit (EPDC) 123 or to either of two indicators 115 and 117 as described below.

The system 100 can further include at least one first indicator 115 operatively connected to the power receptacle 101 to indicate that the external power is available. The voltage check system 111 can be configured to only allow activation of the first indicator 115 when the external power is within the suitable voltage range. The first indicator 115 can be operatively connected to the voltage check system 111 and the EPDC 123 such that the first indicator 115 can be powered at least partially through the EPDC 123 when the EPDC 123 receives power through the voltage check system 111 but while the EPDC is still open (e.g., the manual switch 107 has not yet been closed).

The system 100 can further include at least one second indicator 117 operatively connected to the power receptacle 101 and/or the manual switch 107 to indicate that the external power is in use. The second indicator 117 can be operatively connected to the check switch 111b and the EPDC 123, wherein the second indicator 117 is powered at least partially through the EPDC 123 when the EPDC 123 receives power through the voltage check system 111 and when the manual switch 107 is closed, allowing EPDC 123 to close, changing from the battery power supply 109 to the external power supply 107 setting.

The voltage relay sensor 111a can be configured to determine if the external power is within a low voltage threshold and a high voltage threshold. The low voltage threshold can be about 18 volts DC or any other suitable voltage. In some embodiments, the low voltage threshold is high enough to allow for starting of an auxiliary power unit (APU) 119. For example, the high voltage threshold can be about 32 volts DC or any other suitable voltage.

The voltage relay sensor 111a can be operatively connected to the power receptacle 101 to be powered by the external power supply 105. However, in the event that an APU start causes a power sag in the external power from the external power supply 105 to a voltage below the set point of voltage relay sensor 101a, the battery power source 109 can power the voltage relay sensor 111a to prevent system shutoff by opening the circuit at the check switch 111b.

The EPDC 123 can be operatively connected to the power receptacle 101 via a power bus 121 and/or one or more other suitable electrical connections. The aircraft electrical system 113 can include an APU starter operatively connected to the power receptacle 101 through the EPDC 123 via a power bus 121.

The system can further include a voltage comparator 150 ahead of the voltage relay sensor 111a to allow the battery supply 109 to maintain sufficient voltage at voltage relay sensor 111a for the APU starter to be supplied with power if a sufficiently high voltage is present in the battery supply 109 to account for a voltage droop in the external power due to activating the APU starter, thereby preventing the check switch 111b from opening the circuit during APU start.

Figure 2A:
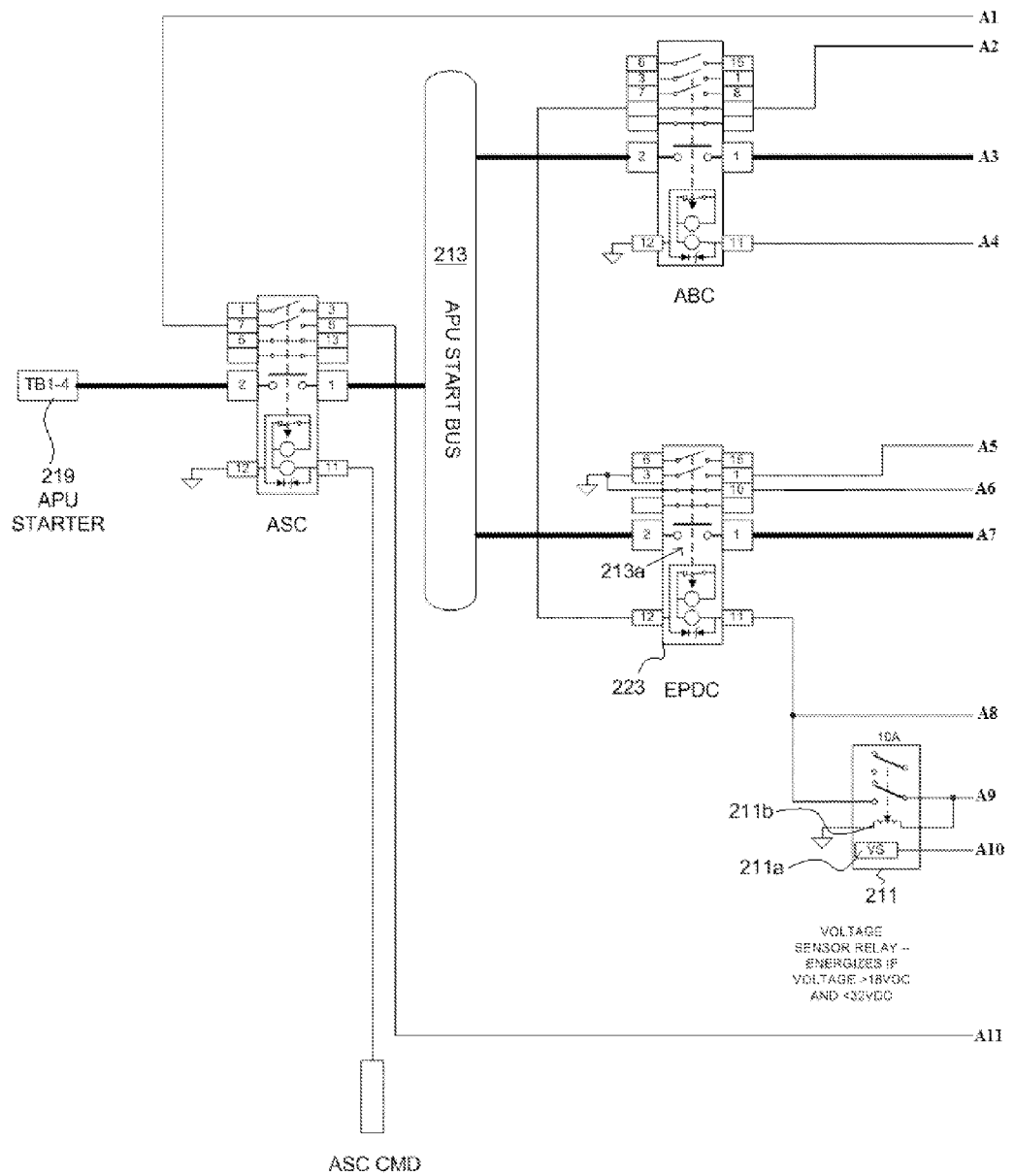
FIGS. 2A and 2B form a circuit diagram of a specific embodiment of an aircraft electrical system in accordance with an example embodiment of this disclosure, wherein FIGS. 2A and 2B link together at portions A1 through A11, respectfully.
Figure 2B:
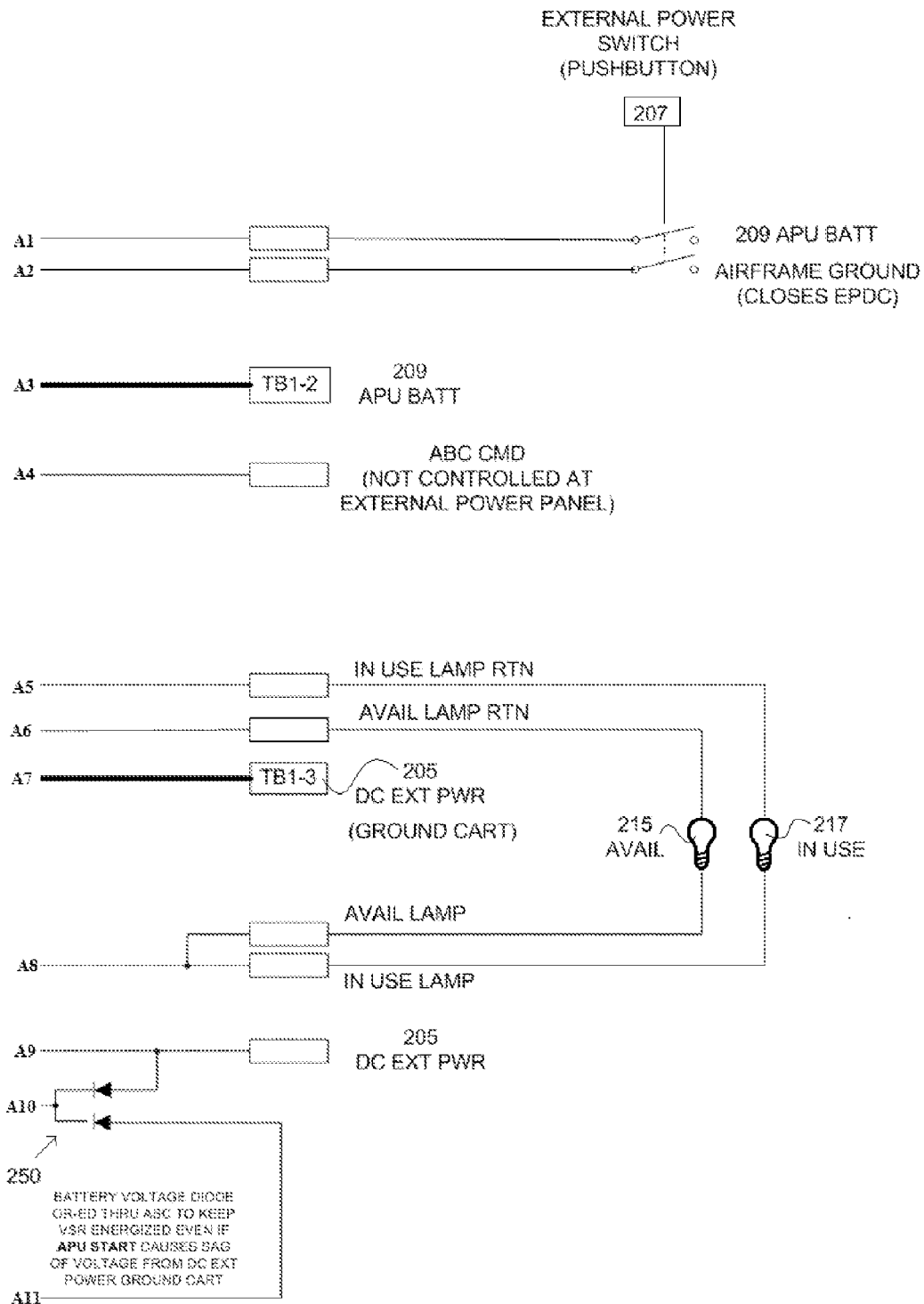

FIGS. 2A and 2B show a circuit diagram of a specific embodiment of an aircraft electrical system 200 having a voltage check system 211 disposed therein. As shown, the EPDC 213 cannot provide power through power bus 221 to an aircraft electrical system 213 without power passing through the voltage check system 211 because the EPDC power switch 223a would not close without sufficient voltage from the external power supply. Thus, voltage check system 211 ensures that a sufficient voltage reaches the EPDC 223 to close the EPDC power switch 223a (and/or not to supply an over-voltage).

Further, indicator lights 215, 217 only operate if a sufficient voltage is available to close EPDC power switch 223a (and/or not to supply an over-voltage) from the external power source 105 because the voltage check system 211 would not pass electrical power to the indicators 215, 217 without a proper voltage. Thus, the available indicator 215 only indicates when a useable external power is actually available and the in-use indicator would be assured to activate and stay on if the power switch 207 is closed since the proper voltage would be supplied to the system 200.

The system 200 further includes a voltage comparator 250 ahead of the voltage check system 211 (e.g., disposed between the battery supply and the external power supply) to allow for the APU starter to be supplied with power if a sufficiently high voltage is present in the battery supply 209 to account for a voltage droop in the external power due to activating the APU starter. As described above, this keeps the voltage relay sensor 211a sufficiently powered to prevent the check switch 211b from opening the circuit during APU start if the external power drops below the minimum voltage threshold since the sensor 211a will be powered by the higher voltage source. The battery supply 209 can be connected to voltage relay sensor 211a through switch 207 and through switching device ABC such that the connection is made only when the APU starter has been engaged and is drawing current from external power source 205.

In at least one aspect of this disclosure, a method includes determining if an external power for an airplane has a voltage within a suitable voltage range, powering an electronic power distribution circuit (EPDC) if the external power for an airplane has a voltage within the suitable voltage range, and preventing power from being applied to the EPDC if the external power has a voltage outside of the suitable voltage range.

The methods and systems of the present disclosure, as described above and shown in the drawings, provide for improved aircraft external DC power voltage protection and indicators that function properly. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. An external power supply system for an aircraft, comprising:
   a power receptacle configured to connect to an external power cable from an external power source to provide an external power;
   a power switch operative to switch between a battery power source and the external power source; and
   a voltage check system configured to prevent both of under-voltage and over-voltage of an aircraft electrical system, the voltage check system including:
   a voltage relay sensor configured to determine if the external power is within a suitable voltage range, wherein the voltage relay sensor is configured to determine if the external power is within a low voltage threshold and a high voltage threshold; and
   a check switch, wherein if the external power is within a suitable voltage range, the voltage relay sensor activates the check switch to allow external power to the aircraft electrical system, wherein if the external power is outside the suitable voltage range, then the voltage relay sensor does not allow power to the aircraft electrical system.

2. The system of claim 1, further comprising at least one first indicator operatively connected to the power receptacle to indicate that the external power is available.

3. The system of claim 2, wherein the voltage check system is configured to only allow activation of the first indicator when the external power is within the suitable voltage range.

4. The system of claim 1, further comprising at least one second indicator operatively connected to the power receptacle to indicate that the external power is in use.

5. The system of claim 1, wherein the low voltage threshold is about 18 volts DC.

6. The system of claim 1, wherein the low voltage threshold is high enough to allow for starting of an auxiliary power unit.

7. The system of claim 1, wherein the high voltage threshold is about 32 volts DC.

8. The system of claim 1, wherein the voltage relay sensor is operatively connected to the power receptacle to be powered by the external power, wherein in the event of a power sag in the external power supply, the battery power source powers the voltage relay sensor to prevent system shutoff.

9. The system of claim 1, wherein the aircraft electrical system includes an electrical power distribution circuit (EPDC) operatively connected to the power receptacle, and connected to and controlled by the voltage check system.

10. The system of claim 1, wherein the aircraft electrical system includes an APU starter operatively connected to the power receptacle.

11. An aircraft electrical system, comprising:
    a power receptacle configured to connect to an external power cable from an external power source to provide an external power;
    a power switch operative to switch between a battery power source and the external power source; and
    a voltage check system configured to prevent both of under-voltage and over-voltage of an aircraft electrical system, the voltage check system including:
    a voltage relay sensor configured to determine if the external power is within a suitable voltage range, wherein the voltage relay sensor is configured to determine if the external power is within a low voltage threshold and a high voltage threshold; and
    a check switch, wherein if the external power is within a suitable voltage range, the voltage relay sensor activates the check switch to allow external power to an electrical power distribution circuit (EPDC) of an aircraft, wherein if the external power is outside the suitable voltage range, then the voltage relay sensor does not activate the check switch.

12. The system of claim 11, wherein the check switch is an inductive coil switch operatively coupled to the voltage relay sensor.

13. The system of claim 11, further comprising a voltage comparator ahead of the voltage relay sensor to allow for an auxiliary power unit (APU) starter to be supplied with power if a sufficiently high voltage is present in the battery supply to account for a voltage droop in the external power due to activating the APU starter, thereby preventing the check switch from opening due to low voltage after an APU start has been initiated.

14. The system of claim 11, further including a first indicator operatively connected to the voltage relay sensor and the EPDC, wherein the first indicator is powered through the EPDC when the EPDC receives power through the voltage check system.

\* \* \* \* \*